Feb. 15, 1949.　　　　　F. HAGUE　　　　　2,461,818
SELF-SEALING COUPLING
Filed Aug. 7, 1946　　　　　　　　　　　2 Sheets-Sheet 1

INVENTOR.
Fred Hague
BY
　　Attorneys

Feb. 15, 1949. F. HAGUE 2,461,818
SELF-SEALING COUPLING
Filed Aug. 7, 1946 2 Sheets-Sheet 2
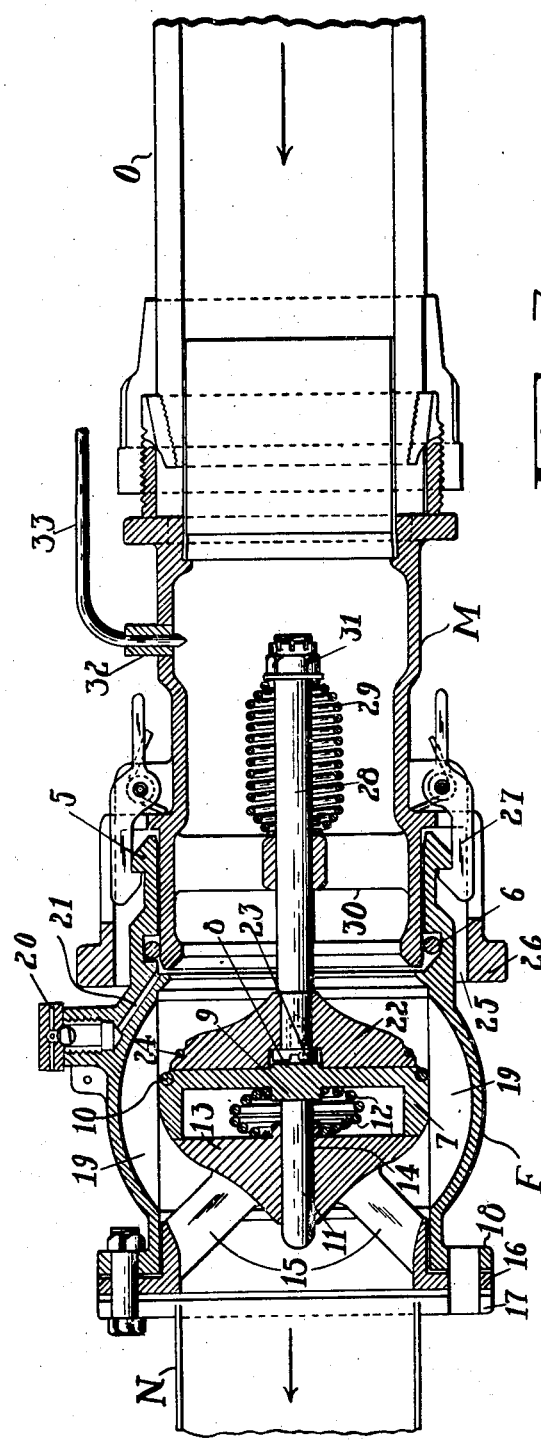
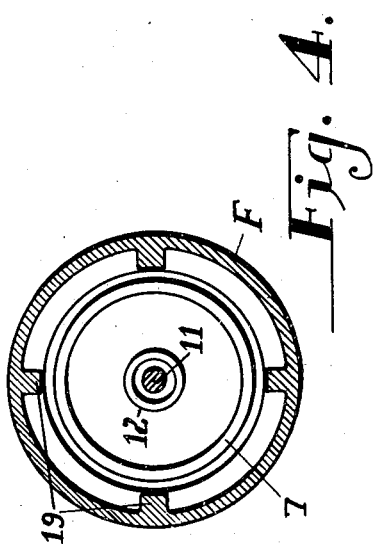
INVENTOR.
Fred Hague
BY
Busser and Harding
ATTORNEYS Patented Feb. 15, 1949

2,461,818

UNITED STATES PATENT OFFICE 2,461,818

SELF-SEALING COUPLING

Fred Hague, Devon, Pa., assignor to Sun Oil Company, Philadelphia, Pa., a corporation of New Jersey Application August 7, 1946, Serial No. 688,819

5 Claims. (Cl. 284—19)

This invention relates to hose couplings and more particularly to a coupling which operates by hydraulic pressure to place the inlet and outlet sections of a supply hose in communication, and when not operating automatically under pressure it prevents communication between the inlet and the outlet sections and hence prevents spillage from the supply and receiving hoses.

Hose couplings of the present invention are of the type used in loading and unloading tank trucks and tank cars etc., where it is necessary to unite a hose permanently fixed to a vehicle, with a liquid supply or liquid dispensing hose. It is especially designed to operate under conditions existing where highly volatile liquids are transferred, and insure against loss by leakage or evaporation.

The principal object of this invention is to provide a hose coupling of two sections both of which remain sealed against passage of fluid therethrough until opened by the pressure of a supply stream entering the outlet member. Another object is to provide for independently sealing each section of the coupling when the coupling members are disengaged, to thereby prevent leakage from each coupling section.

Another object is to permanently secure to the vehicle hose section, and supply or dispensing hose section, complemental coupling members which can be readily and rapidly engaged or disengaged.

Further objects and advantages of the invention will be apparent by reference to the following specification read in connection with the drawings, in which:

Figure 3 is a longitudinal section showing the coupling members joined and the relative position they assume when under pressure.

Figure 4 is a reduced section on line 4—4 of Figure 1.

Figure 1:
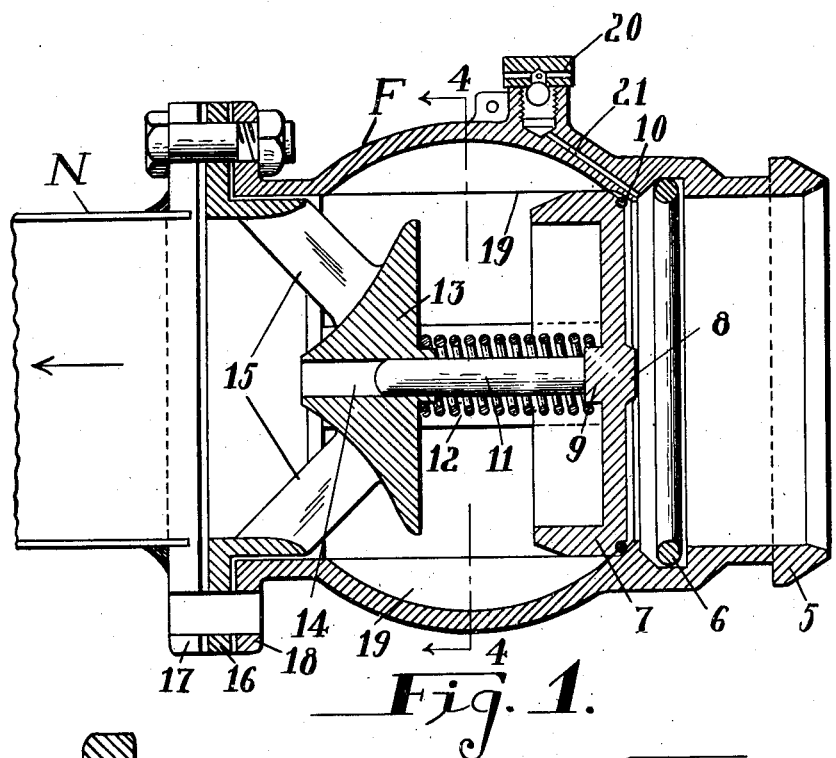
Figure 1 is a longitudinal section of one of the coupling members.
Figure 2:
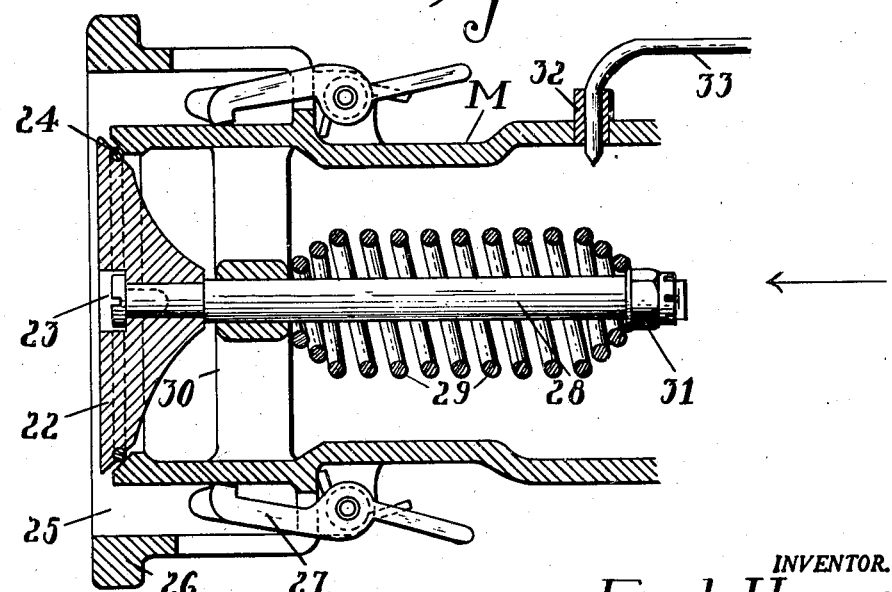
Figure 2 is a longitudinal section of the cooperating coupling member.

The coupling device of the invention is comprised of a female member as shown in Figure 1 and a male member as shown in Figure 2. The female member in Figure 1 includes a body F, which preferably is formed with an external flange or lip 5 to be received in annual groove 25 of the male body member M (Figure 2) for quickly engaging and disengaging the members. When the members are engaged as shown in Figure 3, a ring 6 is spring pressed against the inner wall of female member F and provides a seal with one end of the male member M.

Referring again to Figure 1, a movable valve member 7 is positioned within coupling body F and is provided with boss portions 8 and 9 and a packing ring 10 is fixed on the valve member 7 providing a seal when the member is in closed position. A guide rod 11 has one end secured in boss 9 and a helical spring 12 is positioned therearound and held between the valve member 7 and a guide 13 having a central bore 14 to receive the shaft 11 for reciprocative movement when the valve member 7 is in motion.

The ribs 15 supporting guide 13 form a spider which is secured in fixed position to flanged member 16 which in turn is detachably held as by bolts between flange 17 on hose section N and flange 18 on body member F. An air vent valve 20 is formed as an integral part of coupling body F connecting with flange or lip 5 through aperture 21.

To insure alignment of valve member 7 when it is moved to open or closed position, a plurality of ribs 19, shown in detail in Figure 4 are provided to form bearing or frictional sliding surfaces for the outer periphery of the valve member.

The outlet section or male member M, in the closed position is shown in Figure 2. A movable valve 22, positioned within coupling body M, is provided with a slot or groove 23 and a packing ring 24 recessed therein to effect a seal when the member is in the closed position. Annular groove 25, recessed in the male housing M, between outer ring 26 and the male body member M, is provided with a quick engaging and releasing device, such as the latching elements 27. Shaft 28, centrally positioned within housing M, is secured to valve 22 so as to slidably engage the centrally positioned spider 30. The rib structure of spider 30 acts as a stop for spring 29, centrally positioned about shaft 28, which is retained by the nut and washer assembly shown in 31. A pressure relief valve 32 and bleeder pipe 33 are let into the male coupling chamber M.

The coupling in the operating position with both the male and female body members engaged is shown in Figure 3. Upon joining the coupling members the groove or aperture 23 in the male valve component 22 engages the boss 8 of the female valve element 7, while packing ring 6 affects a seal substantially as shown. The direction of flow indicated by arrows in outlet hose O and inlet hose N shows the movement of fluid under pressure which forces valve 22, centrally located within the male body member M, to engage the valve 7 in the female body member F. The forward movement of the valve member 22 in the male body member M, caused by the pressure of the fluid transmitted through hose O, compresses spring 29 and forms a passage around the cooperating valves, permitting the fluid to flow through the spider and rib supports 30 to inlet hose N. Alignment of the male valve member 22 is preserved by shaft 28 moving in sliding engagement through centrally positioned spider 30 and the support of boss 8 on valve 7 cooperating with groove 23 on the face of valve 22. These valve heads, it will be noted, are designed to present a minimum of interference to the flow of the fluid. Valve member 7 in the female body member F moves in the direction of flow because of the action of the male member as just described, compressing spring 12, and comes to rest in a fully open position against the rib supported guide 13. The movement of the valve in the female body member is guided by shaft 11 slidably cooperating with the guide 13 and is further supported by ribs 19 which are shown more fully in Figure 4. Upon release of the fluid pressure spring 12 expands, pushing valve 7 into the end of the female body member F, forming a seal with the machined surface of the valve body cooperating with packing ring 10. During the same movement valve 22 in the male body member M is withdrawn by the expansion of spring 29 to resume its position against the machined surface cooperating with packing ring 24. It is thus evident that the closing motion is contrary to the direction of flow of the fluid which caused the valve members of the coupling to move into the open position. This return movement caused by the springs acting on the male and female valve members respectively is assisted by the back pressure of the fluid operating against valve 7 in the female body member F, and the release of pressure in the male body member M through relief valve 32 and bleeder pipe 33. The closed position will therefore be resumed by shutting off the fluid pressure while the coupling members are still engaged. Air admitted through air vent valve 20 and aperture 21 enables the coupling members to be rapidly separated by breaking the suction established between the machined faces of the valve members.

I claim:

1. A hose coupling including an inlet section and an outlet section, each of said sections having a valve seat and an axially movable valve member therein, each of said valve members comprising a head and stem, a spider bearing transversely positioned in each section, the stems of said valves slidably supported by the hubs of said spider bearings, thereby preserving the valve alignment, springs disposed about said valve stems in abutting contact with the spider bearings to maintain said valves normally seated until fluid pressure is applied to the valve member in the inlet section, and means for detachably coupling said sections together and positioning said valve members in abutting relation.

2. A hose coupling including an inlet section and an outlet section, each of said sections having a valve seat and an axially movable valve member therein, guide means for each valve member to permit axial movement and preserve the alignment of said valve members, spring means to maintain said valves normally seated until fluid pressure is applied to the valve member in the inlet section, and means for detachably coupling said sections together and positioning said valve members in abutting relation.

3. A hose coupling including an inlet section and an outlet section, each of said sections having a valve seat and an axially movable valve member therein, guide means for each valve member to permit axial movement and preserve the alignment of said valve members, spring means to maintain said valves normally seated until fluid pressure is applied to the valve member in the inlet section, means for detachably coupling said sections together and positioning said valve members in abutting relation, and a pressure reduction means cooperating with the inlet section comprising a relief valve and bleeder pipe.

4. A hose coupling including an inlet section and an outlet section, each of said sections having a valve seat and an axially movable valve member therein, guide means for each valve member to permit axial movement and preserve the alignment of said valve members, spring means to maintain said valves normally seated until fluid pressure is applied to the valve member in the inlet section, means for detachably coupling said sections together and positioning said valve members in abutting relation, a relief valve and bleeder pipe cooperating with the inlet section, and means in the outlet section to admit air to the abutting valve members during uncoupling.

5. A hose coupling including an inlet section and an outlet section, each of said sections having a valve seat and an axially movable valve member therein, each of said valve members comprising a head and stem, a spider within the inlet section positioned to slidably support within its hub the valve member stem in axial alignment therein, aligning means for the valve member in said outlet section comprising a spider and a plurality of longitudinally extending ribs disposed peripherally about said valve head on the inner wall of the outlet section, spring means disposed about said valve stems abutting the spider hubs for maintaining each of said valve members normally seated until fluid pressure is applied to the valve member in the inlet section, means for detachably coupling said sections together and positioning said valve heads in abutting relation, a relief valve and bleeder pipe cooperating with the inlet section to release pressure prior to uncoupling, and means in the inlet section to admit air to the abutting valve heads to break adhesion on uncoupling.

FRED HAGUE.

REFERENCES CITED

The following references are of record in the file of this patent:

UNITED STATES PATENTS

| Number | Name | Date |
|---|---|---|
| 166,489 | Westinghouse | Aug. 10, 1875 |
| 949,329 | Pahlow | Feb. 15, 1910 |
| 1,779,421 | Cox | Oct. 28, 1930 |
| 1,850,879 | Hunt | Mar. 22, 1930 |
| 2,173,295 | Coles | Sept. 19, 1939 |
| 2,278,580 | Coles | Apr. 7, 1942 |
| 2,299,193 | Trautman | Oct. 20, 1942 |
| 2,322,449 | Johnson | June 22, 1943 |